United States Patent [19]

Walto

[11] 4,232,505
[45] Nov. 11, 1980

[54] DUAL ELEMENT FILAMENT MOWER

[75] Inventor: Joseph J. Walto, Chaska, Minn.

[73] Assignee: The Toro Company, Minneapolis, Minn.

[21] Appl. No.: 932,353

[22] Filed: Aug. 9, 1978

[51] Int. Cl.³ ............................................ A01D 35/264
[52] U.S. Cl. .................................... 56/12.7; 56/13.6; 56/320.1
[58] Field of Search ................ 56/13.6, 6, 17.5, 320.2, 56/11.9, 320.1, 12.7

[56] References Cited

U.S. PATENT DOCUMENTS

| | | | |
|---|---|---|---|
| 2,071,872 | 2/1937 | Cockburn | 56/13.6 |
| 2,114,096 | 4/1938 | Noel | 56/13.6 |
| 3,157,014 | 11/1964 | Bottenberg | 56/320.2 |
| 3,500,620 | 3/1970 | Duran et al. | 56/13.6 |
| 4,112,653 | 9/1978 | Ballas etal. | 56/12.7 |

Primary Examiner—Jay N. Eskovitz
Attorney, Agent, or Firm—Merchant, Gould, Smith, Edell, Welter & Schmidt

[57] ABSTRACT

A lawn mower using flexible nonmetallic filaments as cutting elements is disclosed. The filaments are mounted on a plurality of rotatable mounting elements. Each of these mounting elements is rotatable about an axis which is slightly tilted with respect to the vertical. The axes of rotation of the mounting elements are so disposed that the filaments appear to travel through overlapping paths when the lawn mower is viewed in top plan. With respect to the normal forward direction of travel of the lawn mower, the axes are "staggered", one of the axes being forward of the other axis.

8 Claims, 6 Drawing Figures

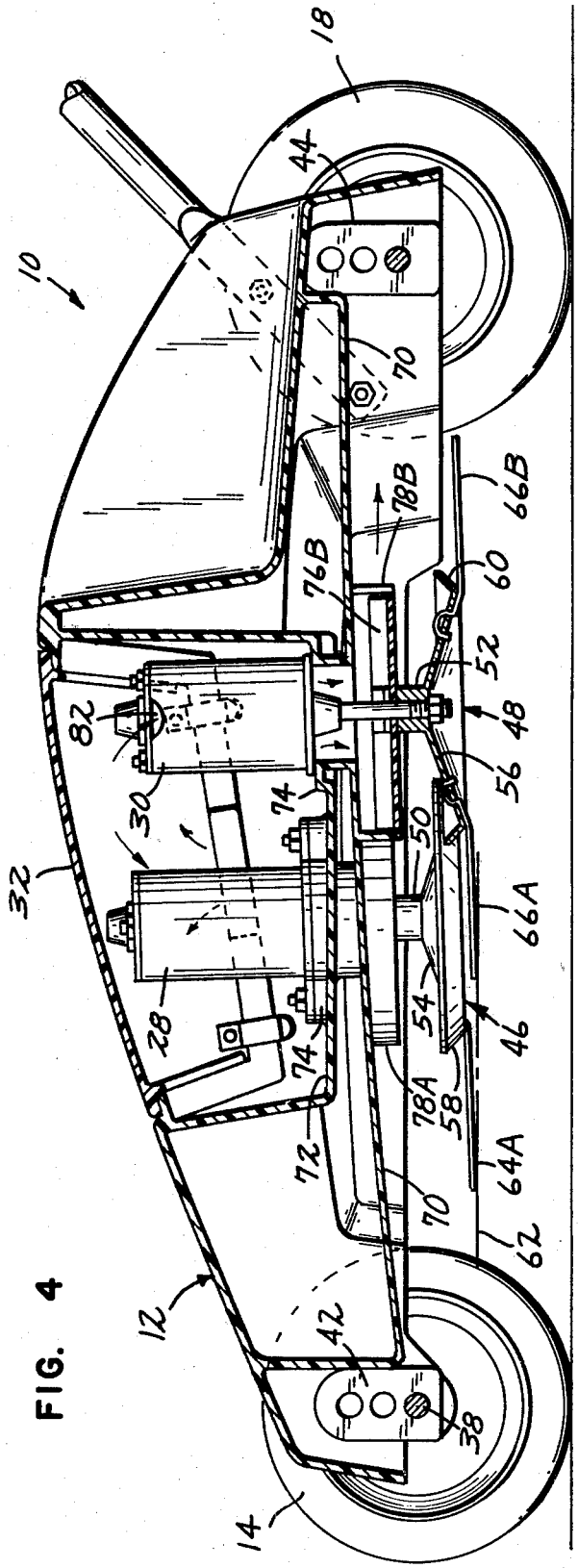
FIG. 4
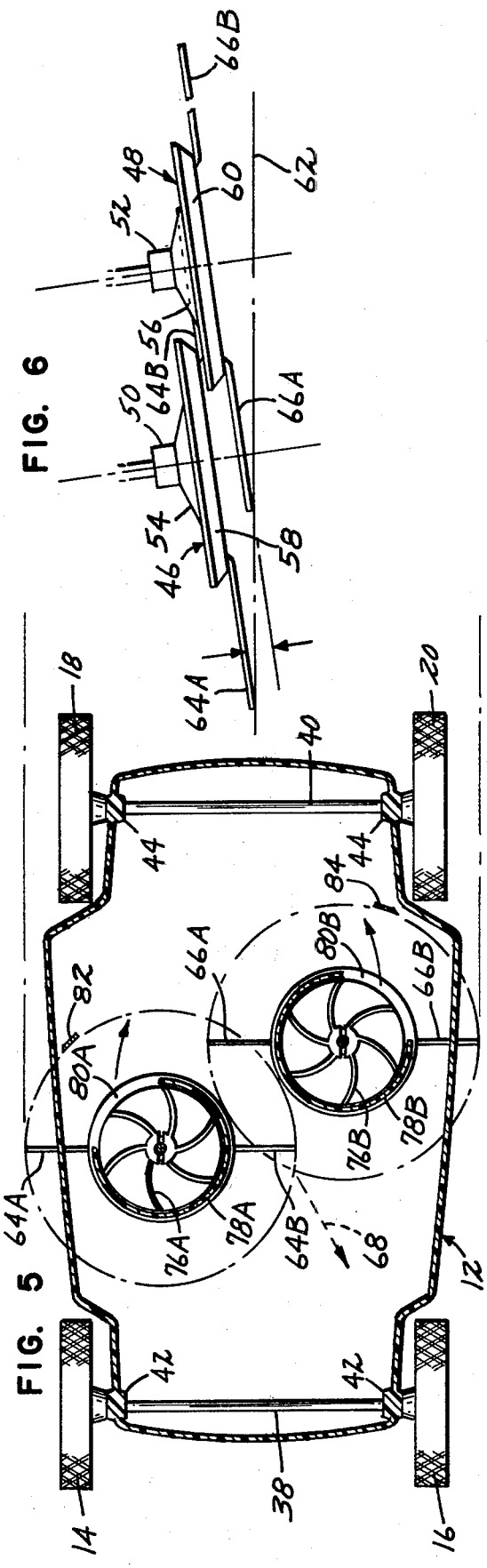
FIG. 6
FIG. 5

DUAL ELEMENT FILAMENT MOWER

BACKGROUND OF THE INVENTION

This invention relates generally to apparatus used for cutting vegetation, and more particularly relates to a lawnmower and trimming implement of the type in which flexible nonmetallic cutting elements are mounted for rotation about a nearly vertical axis within a mower housing.

The present invention relates to a lawn mower in which cutting of grass is achieved by contact between the grass and free lengths of flexible nonmetallic filament mounted for rotation about a plurality of nearly vertical axes. The invention is drawn to an improvement in a lawn mower of the type which is generally disclosed in an application filed the same date as the present application, and entitled "Dual Element Filament Mower", in the names of Robert C. Comer and Henry Tillotson, the referred-to application being assigned to the same assignee as the present application.

Dual element filament mowers of the type disclosed in the application filed on behalf of Tillotson and Comer have a number of advantages over the prior art. Among these are lower power consumption, more maneuverability, and economies of manufacture. However, the present invention provides improvements in the quality and evenness of cut of a mower of this type without sacrificing such advantages.

One area of possible improvement noted in dual element filament mowers is in the quality of cut in the central area of the mower, that is that area directly forward of the overlapping zones of the adjacent cutting elements. It appears that, under certain cutting conditions, the combined air-pumping effect of two counter-rotating elements which overlap in the same cutting plane is to tend to "blow down" grass directly ahead of the overlapping zone on a line equidistant from the centers of rotation of the two elements. Also, since the elements are not normally synchronized, some contact between the flexible filaments occurs in the overlapping zone. This tends to result in line "flutter" which creates some unevenness of cut centrally of the mower.

Furthermore, in many applications, it desirable to have a combined mower and trimmer in which no bagging or collection of cut grass particles occurs. In filament cutting element type mowers, suspension and evacuation of the housing of the mower is not readily achieved, since the trailing sail portion which is usually found in rigid bladed mowers is missing. While comparable air circulation may be generated by using an on-axis fan suspended above a rotating cutting element, this is not particularly practical or economical, and defeats certain advantages inherent in a nonmetallic flexible filament mower. Therefore it is desirable to have a filament mower design which disburses cut grass particles as evenly as possible consistent with high quality of cut, yet prevents the recirculation and build-up of cut grass particles under the housing which one might normally expect absent an air-pumping system. The present invention is an improvement in dual element type filament mowers which is directed at these areas of need.

SUMMARY OF THE INVENTION

Applicant's invention includes at least two filament mounting elements which are rotatably mounted on a support housing capable of movement over a ground surface to be mowed at a controlled height above that surface. Each of the filament mounting elements is mounted to the housing at a forwardly tipped angle, so that axis of rotation is not vertical. However, this angle is sufficiently small so that scalloping of the cut lawn surface caused by such tipping is not readily discernible. With respect to the normal forward direction of movement of the mower, one of the filament mounting elements is mounted forward with respect to the other so that the two elements are "staggered rather than laterally aligned". The filament mounting elements each accept one or more nonmetallic flexible filament cutting elements. The nonmetalic flexible filaments are mounted to each filament mounting element so that, during rotation, each element has a free unsupported length extending outward from the mounting element and defining a cutting path below the support housing. The axes of rotation of adjacent filament mounting elements are so disposed that, when viewed in top or bottom plan, the filaments appear to have a zone of overlap. However, the combined effect of the forward tilt of the axes of these elements and the staggered placement prevents actual filament interference in the zone of overlap and thereby prevents line "flutter".

In certain classes of embodiments of the present invention, it has been found preferable to construct the mower such that the angle a line through the centers of rotation of the elements makes with a line transverse to the normal direction of travel of the mower is in the range of 30 to 40 degrees. Also, it has been found preferable to use a support housing having a top wall positioned a short distance above the rotatable elements and defining a cylindrical surface with axis transverse to normal travel of the mower to avoid recirculation of grass particles and build-up underneath the housing.

Also, in certain embodiments in which electric motors are individually used to power the filament mounting elements, and cooling for such motors is necessary, it has been found preferable to shroud fans mounted on the motor shaft for such purpose to create an air-flow underneath the support housing which discharges rearward of the mower.

The effect of forward tipping of the axes of the filament mounting elements and staggering of the elements with respect to the normal forward direction of movement of the mower appears to create significantly improved evenness of cut for two reasons. First, there is a significant decrease in line flutter in the zone of overlap since the free unsupported length of filament do not interfere with or contact one another in normal operation of the present invention. Second, the direction of maximum air-flow created due the zone of apparent overlap of the adjacent rotating filament is directed at an angle rather than along the normal line of travel of the mower with the present invention. This aids dispersing flow and preventing grass "blow-down" ahead of and centrally of the mower which might otherwise cause the mower to leave stringers or uncut blades of grass centrally of the mower under certain cutting conditions.

Various other advantages and features which characterize this invention are pointed out with particularity in the claims attached to and forming a part of this application. However, for a better understanding of the invention, its advantages, and objects obtained by its use, reference should be had to the drawings which further form a part of this application and to the accompanying description of preferred embodiments which follows.

BRIEF DESCRIPTION OF THE DRAWINGS

FIG. 4 is an enlarged sectional view of the lawn mower illustrated in FIG. 1 and taken generally along lines 4—4 of FIG. 1;

FIG. 5 is an enlarged sectional view of the mower of FIG. 1 taken along the lines 5—5 of FIG. 1;

FIG. 6 is a diagrammatic view showing two filament mounting elements and associated filaments with the angle of tip of axes of the elements exaggerated to illustrate a feature of the present invention.

DETAILED DESCRIPTION OF THE INVENTION

Figure 1:
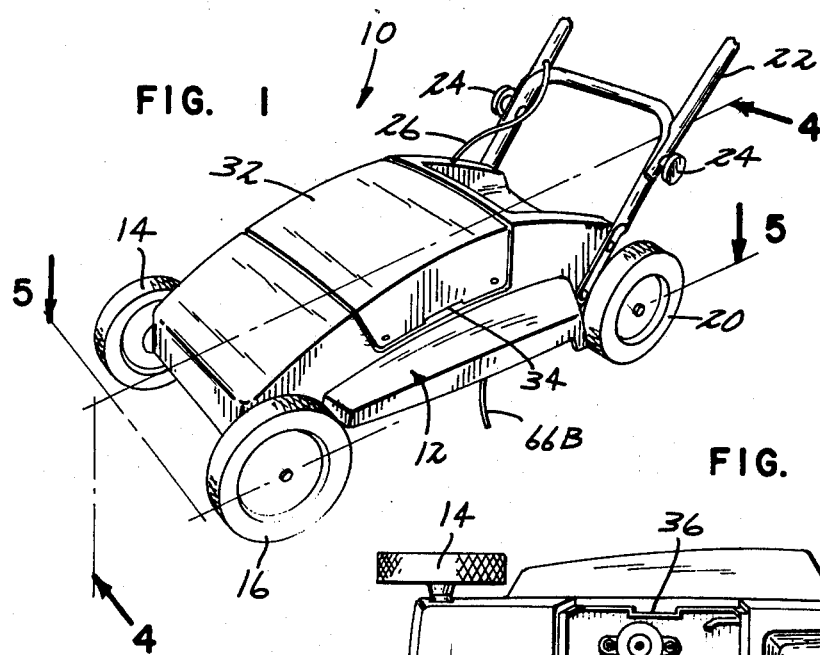
FIG. 1 is a perspective view of a lawn mower constructed according to one embodiment of the present invention, portions of an operator handle of which are cut away since they are not believed essential to the understanding of the invention.

Referring to the drawings in detail, wherein like numerals are indicate like elements, there is shown in FIG. 1 a lawn mower generally designated 10 which is constructed in accordance with one embodiment of the present invention. Lawn mower 10 has a support housing generally designated 12, the top surface of which is shown in FIG. 1. Attached to support housing 12 are a pair of ground engaging front wheels 14, 16 and a second pair of ground engaging rear wheels 18, 20. These wheels support housing 12 for movement over a ground surface to be mowed at a controlled height above the surface. Mower 10 further includes an operator handle 22 of generally tubular form which is only partially shown since details of its construction are not important to the present invention. In the embodiment shown, operator handle 22 may have adjustment knobs 24, 24 which may permit length adjustment and/or folding of the operator handle for a user's convenience.

Figure 2:
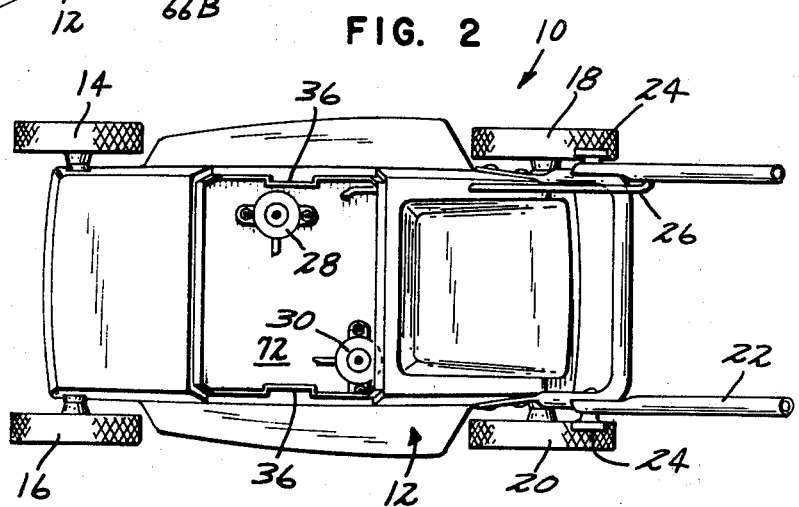
FIG. 2 is a top plan view of the mower of FIG. 1, with a motor housing cover removed to allow illustration of a specific mounting orientation of the invention.

Mower 10 further includes a power cord 26 to transmit power to a pair of electric motors 28, 30 (shown in FIG. 2). Although any suitable drive means may be used, these electric motors provide this specific embodiment with drive power for the two rotating filament mounting elements which hold the cutting filament for the mower.

Also depicted in FIG. 1 is an engine compartment cover 32 removable from support housing 12 to expose electric motors 28, 30 to allow for servicing or replacement of these motors. Cover 32 includes a pair of opposed vents 34, 34. Vents 34, 34, in combination with a pair of channels 36, 36, in the walls of support housing 12, form a air inlet to allow cooling air to be drawn into the engine compartment.

It will be understood by those of skill in the art that, while the exterior design of the dual filament mower shown in FIG. 1 is a distinctive construction, the exterior configuration of the support housing, shown most clearly in FIG. 1, is not essential to the present invention.

Figure 3:
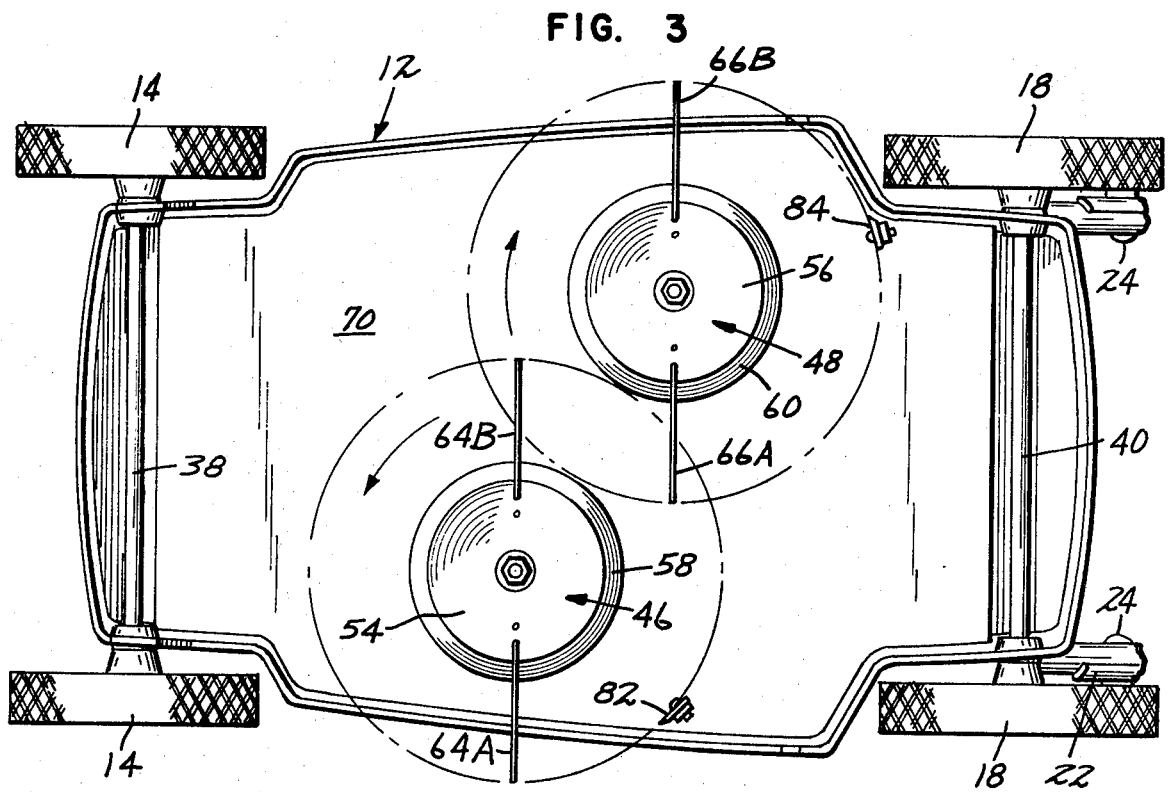
FIG. 3 is an enlarged bottom plan view of the lawn mower illustrated in FIG. 1.

FIGS. 3 and 4 provide the best illustration of details of construction of the present invention. In these figures, wheels 14, 16 and 18, 20 are shown mounted by means of axles 38 and 40 respectively to support housing 12. In the specific embodiment shown, support housing 12 carries conventional wheel attachment flanges 42, 44, each of which carries a plurality of holes to make height of cut adjustments for the mower in a conventional manner. Axles 38, 40 and fixed wheels 14, 16, 18, 20 together define a normal direction of travel of lawn mower 10 generally transverse to axles 38 and 40. This direction of travel is generally parallel to the plane defined by the section taken for the purpose of FIG. 4.

FIG. 4 includes a pair of filament mounting elements 46, 48 which are mounted to and extend below support housing 12. In the embodiment shown, these filament mounting elements each have central hubs 50, 52, each of which is secured to the shaft of its respective electric motor by means of a suitable fastener. Each of the mounting elements also includes a medial section shaped as a truncated cone extending downward and outward from its respective hub. These medial sections are identified with reference numerals 54 and 56 respectively. At the periphery of medially extending portions 54 and 56 are a pair of peripheral upwardly extending angular rim 58 and 60, each of which surrounds the medial section of one of the filament mounting elements. Rims 58, 60 upwardly deflect some of the air flow developed by the motor cooling fan and by the top surface of the medial section of the filament mounting element to prevent uncut grass from being blown down ahead of the advancing mower. Rims 58, 60 also strengthen and reinforce mounting elements 46 and 48 respectively.

As shown most particularly in FIG. 4, and exaggerated for purposes of illustration in FIG. 6, filament mounting elements 46 and 48 are mounted for rotation about axes which are tipped forwardly from the vertical. It is known to provide at least a small degree of tipping of the axis of rotation with a fixed-bladed lawn mower to cut power consumption and eliminate grass tip contact in the rear quadrants of rotation. However, with the present invention, it has been founded preferable to use a tip angle of approximately 2 degrees, nearly double that commonly found, to compensate for filament flutter which occurs when filaments contact particularly heavy load portions of the lawn or fixed objects. The two degree angle of the axes may be measured with reference to a horizontal line. (Designated 62 in FIG. 4.)

As shown in the figures, the filament mounting elements are staggered, that is one of the elements is mounted ahead of the other element with reference to the normal direction of travel of the mower. Filament mounting means 46 carries a pair of flexible nonmetallic filament cutting elements 64a, 64b spaced at 180 degrees from one another and securely mounted to element 46. Element 48 likewise has a pair of highly flexible cutting elements 66a, 66b, secured to it. These filaments may be secured to the mounting elements by any suitable means. The means shown in the figures is a curling of the filament through a pair of holes on the medial section of the mounting element. During operation the filaments, which may be made of a resinated nylon having a cross sectional diameter of between 0.040 and 0.125 inches, are spun at sufficient speed to cause them to assume a generally radial position with their free unsupported lengths acting as grass cutting edges. When the mower is viewed in top or bottom plan, there is a zone of overlap between the slightly tilted cutting plane defined by the rotating members. However, there is no actual overlap or line interference because of the combined effect of the staggered mounting of the elements and the tilt angle which each makes with a vertical line. The filament mounting elements are so mounted in the support housing that the leading edge of each effectively defines the cutting plane.

However, in the zone of overlap, the filament 66a and 66b pass below 64a and 64b due to the angle of tilt between them and the staggering, which causes the zone of overlap to be in different portions of the cutting planes of the two filament mounting elements.

In one specific embodiment of the invention this apparent zone of overlap, measured along a line between the two centers of the filament mounting elements, was 3 inches. The cutting overlap of the two elements measured along the normal line of travel of the mower was 4 inches. While these are not critical figures, it is important to have a substantial actual overlap, at least one inch, between the two units.

There is also a preferred angle between the centers of a rotation of the mounting elements 46 and 48 and a line transverse to the normal direction of travel of the mower. The preferred range is between 30 degrees and 40 degrees. If this angle is less than 30 degrees, there is increased risk of filament mixing and contact because the cutting planes defined by the rotating filaments begin to intersect. If the angle is greater than 40 degrees, it has been found that the forward element must take much more of the cutting load and is less efficient in its operation.

In the zone of apparent overlap between the dual rotating elements, there is an increased air-pumping effect which causes a flow generally directed along a line equidistant between the centers of the elements. This is represented by arrow 68 in FIG. 5. This flow has a tendency to "blow-down" or bend over the uncut grass filaments ahead of the mower and to interfere with evenness of cut. In prior art mowers, which have had the elements laterally spaced rathered than staggered, the combined effect of the line mixing in the zone of overlap and this blow-down has been known to cause unevenness of cut centrally of the mower in some applications. The staggered placements of the elements not only eliminates the line mixing, but by directing the primary flow across rather than parallel to the normal direction of the mower, eliminates or substantially reduces this problem.

As previously mentioned with filament type cutting elements there is normally no trailing said used to disperse and remove cut grass clippings from the underside of the mower. In order to facilitate even spreading of the cut grass clippings and dispersion from both sides of the mower, support housing 12 is provided with a substantially continuous bottom wall 70 which is cylindrical in form with a slight concavity upward. This allows it both to strengthen the housing and to aid in even dispersion of cut grass particles.

In embodiments in which electric motors are used as a source of power, it is important to provide cooling air-flow for these motors without imposing undesirable air-flow on the surface to be mowed. FIGS. 4 and 5 show one embodiment of a mower in accordance with the present invention which utilizes electric motors 28, 30 and provides a controlled flow. Electric motors 28, 30 are fastened to a bottom wall 72 of the mower motor compartment by means of mounting flanges 74, 74 which may be molded into the compartment wall structure or provided in any other appropriate way. Each of the motors is mounted in a shaft-down configuration and each carries one of centrifugal fans 76a and or 76b which is mounted to the shaft of its respective motor for rotation therewith. These fans are mounted below bottom wall 70 yet within one of a pair of cylindrical shouds 78a and 78b which may be molded into the housing bottom wall or otherwise fastened as a separate piece to it. Each of the shrouds has an opening 80a or 80b from which air is expelled rearwardly to avoid undesirable flow which might impact uncut particles in the path of the ongoing mower. The path of cooling air for the motors is as is shown by arrows in FIGS. 4 and 5. This flow enters the engine compartment through the air inlet slots formed by elements 34 and 36, enters the individual motors through housing apertures, one of which is designated 82 in FIG. 4, and is drawn downward through the motor housing by fans 76a and 76b to be expelled rearwardly by means of the shrouding provided around these fans.

As shown particularly in FIGS. 3 and 5, the mower of this invention may also be used for trimming purposes as the filament cutting elements may extend beyond the edges of the housing to allow the filament to trim along a wall, fence, or other fixed obstacle. Also shown mounted to the under side of the mower are filament cut-off blades which may be of particular use in mowers having stored filament to be played out when flexible cutting elements wear or break. These cutting edges limit the length of the filaments to prevent overloading of the individual motors and to maintain the individual filaments at a length short enough so that they are effective cutting elements. These cutting-off blades are labled 82 and 84 in FIG. 3.

It will be apparent from the foregoing discussion that the present invention provides significant improvements in a filament mower having dual rotatable elements. Numerous characteristics and advantages of the invention have been set forth in the foregoing description, together with details of the structure and function of the invention, and the novel features of invention are pointed out in the appended claims. The disclosure, however, is illustrative only, and in changes may be made in detail, especially in matters of shape, size and arrangement of parts, within the principal invention, to the full extend indicated by the broad general meaning in which the appended claims are expressed.

What is claimed is:

1. A dual element filament mower, comprising, in combination;
   (a) a support housing;
   (b) means mounting said housing to enable movement of said housing over a ground surface at a controlled height thereabove, in a preferred direction;
   (c) a plurality of filament mounting means suitable for attachement to said housing;
   (d) means mounting said filament mounting means to said housing in staggered configuration with one of said filament mounting means ahead of the other with respect to said preferred direction, each of said filament mounting means being mounted with its axis of rotation tipped with respect to the vertical;
   (e) at least one flexible nonmetallic filament mounted to each filament mounting means, at least a portion of each of said filaments having a free unsupported length extending generally radially outward from said mounting means during driven rotation thereof, said free unsupported lengths being sufficiently short so that, during cutting operations, said filament free unsupported lengths define a plane substantially perpendicular to the axis of rotation of said mounting means to which the filaments are mounted;

(f) drive means for rotatably driving said plurality of filament mounting means at a speed sufficient to stiffen said filaments and to permit impact cutting of uncut grass particles thereby; and (g) the distance between the axes of rotation of adjacent filament mounting means being less than the sum of the radial extents of the filament free lengths on adjacent filaments mounting means; with (h) said mounting means being sufficiently tipped and staggered so that filaments on adjacent mounting means define non-intersecting paths of rotation which overlap when viewed in elevation.

2. Apparatus in accordance with claim 1 wherein two filament mounting means are attached to said housing, said drive means rotates said two filament mounting means in opposite rotative directions, and the axis of rotation of each of said filament mounting means is forwardly tipped by an angle of two degrees or greater.

3. Apparatus in accordance with claim 1 wherein said filament mounting means are mounted such that the angle a line through the centers of rotation of the filament mounting means forms with a line transverse to said preferred direction is in the range of 30° to 40°.

4. Apparatus in accordance with claims 1 or 2 in which the distance between said axes of rotation is substantially 2 inches or greater less than the sum of said radial extents.

5. Apparatus in accordance with claims 1 or 2 in which said support housing includes a bottom wall having a cylindrical surface with an upward concavity therein extending substantially continuously about said filament mounting means.

6. A dual element filament mower of the type wherein a plurality of rotating filament mounting elements carrying flexible nonmetallic filament cutting elements which pass through overlapping paths during rotations are affixed to a mower housing having ground-engaging wheels for movement over a ground surface in a preferred direction, wherein the improvement comprises:

means mounting said filament mounting elements with axis of rotation of one element ahead of the other with respect to said preferred direction, and the axes of rotation of both of said elements tipped substantially with respect to the vertical, so that the cutting planes defined by the filaments of each of said mounting elements do not intersect.

7. The mower of claim 6 wherein a line between said axes of rotation and a line transverse to said preferred direction form an angle in the range of 30°–40°.

8. The mower of claim 6 or 7 wherein each of said filament mounting elements is mounted with its axis of rotation forwardly tilted with respect to the vertical by an angle of 2° or greater.

* * * * *